United States Patent [19]
Castaing

[11] Patent Number: 4,676,488
[45] Date of Patent: Jun. 30, 1987

[54] TAPERED LEAF SPRING

[75] Inventor: Francois J. Castaing, Bloomfield Hills, Mich.

[73] Assignee: American Motors Corporation, Southfield, Mich.

[21] Appl. No.: 817,027

[22] Filed: Jan. 8, 1986

[51] Int. Cl.$^4$ .............................................. F16F 1/18
[52] U.S. Cl. ..................................... 267/47; 267/158
[58] Field of Search .................... 267/40, 42, 54 B, 7, 267/17 A, 19 A, 43, 44, 160, 158, 47, 36 R, 41, 45, 46, 148, 149

[56] References Cited

U.S. PATENT DOCUMENTS

| | | | |
|---|---|---|---|
| 2,533,511 | 12/1950 | Rowland et al. | 267/47 |
| 2,596,655 | 5/1952 | Converse | 267/19 A |
| 2,654,597 | 10/1953 | Barenyi | 267/47 |
| 3,190,632 | 6/1965 | Barenyi | 267/47 X |
| 3,241,854 | 3/1966 | Hamilton | 267/47 X |
| 3,377,060 | 4/1968 | Sherwood | 267/47 X |
| 3,452,974 | 7/1969 | Dixon | 267/47 |
| 3,705,718 | 12/1972 | Fukui et al. | 267/47 |
| 3,945,625 | 3/1976 | Duchemin | 267/47 |
| 3,975,005 | 8/1976 | Duchemin | 267/47 |

FOREIGN PATENT DOCUMENTS

| | | | |
|---|---|---|---|
| 0094807 | 7/1980 | Japan | 267/40 |
| 0117928 | 7/1984 | Japan | 267/158 |

OTHER PUBLICATIONS

"Manual on Design and Application of Leaf Springs", (Apr. 1980) pp. 40-44, 101-113.

*Primary Examiner*—Duane A. Reger
*Attorney, Agent, or Firm*—Brooks & Kushman

[57] ABSTRACT

A spring for use in a vehicle suspension comprises at least one leaf having longitudinal ends tapering outwardly from one end of the spring to the other to form a substantially trapezoidal shaped leaf spring. The leaf is resiliently biased by a spring constant to a normally semi-elliptical shape which deflects into a substantially linear orientation when the vehicle supported upon a ground surface by the suspension. The linear orientation of the usually semi-elliptical spring maximizes resistance to lateral distortion in the direction normal to the longitudinal axis of the spring. Preferably, the spring comprises a single leaf having tapered longitudinal edges and an eye at each longitudinal end adapted to receive a mounting pin therethrough.

12 Claims, 3 Drawing Figures

TAPERED LEAF SPRING

BACKGROUND OF THE INVENTION

I. Field of the Present Invention

The present invention relates generally to motor vehicle suspension systems, and more particularly to a leaf spring construction for use in motor vehicles.

II. Description of the Prior Art

Many previously known motor vehicles suspension systems include leaf springs for resiliently suspending an axle housing or other means for rotatably supporting a vehicle wheel with respect to the frame of the vehicle. Often, the spring comprises a plurality of flat leaf springs with a rectangular ribbon-type shape. The spring is resiliently biased to form a semi-elliptical shape wherein the central portion of the spring is resiliently biased outwardly from the ends of the spring, and the resiliency is maintained by stacking a greater number of leaves at the center of the spring than at each end of the spring. While such a spring is well adapted for resilient deflection normal to the plane of the spring leaves, the length of the spring is typically much greater than the width of the spring leaves. As a result, lateral forces which can be exerted upon the wheel relative the the frame, such as centrifugal forces encountered during cornering, can cause the spring to deflect laterally and thus disorient the wheels from a desired stable position with respect to the frame.

One previously known means for restricting lateral displacement of the wheel due to lateral deflection of the spring comprises the installation of supports which restrict such movements. For example, radius rods, track bars and the like are secured to and between a suspended component and a fixed vehicle structure such as a framing member. However, such members can reduce the ground clearance of the vehicle since they must clear the drive train extending beneath the vehicle. Alternatively, the supports can be specially configured to extend around protruding components whereby the support is particularly configured for use with only one particular type of automobile. Thus, the manufacturing of such supports is subject to substantial expense for a wide range of vehicles. Moreover, even if a particular support can be applied to a wide variety of vehicles, such supports are often made of steel or other heavy metals, thus increasing the weight of the vehicle. Furthermore, such members and their connections with the automobile, are subject to wear and corrosion such that they may become ineffective and must be replaced in addition to normal replacement of the other suspension components.

One previously known means for strengthening the spring itself is shown in U.S. Pat. No. 3,975,005 to Duchemin. That patent discloses a spring leaf construction in which the leaf is formed from a bar having a circular cross-section at its center and a progressively flattened cross-section toward each end. While such a spring leaf construction provides a substantial amount of strength at the center of the leaf, and thus avoids the need for stacking a plurality of flat leaf springs together, the cylindrical center portion of the spring is narrower than the longitudinal ends of the spring and also subject to lateral deflection when subjected to lateral forces.

U.S. Pat. No. 2,654,597 to Barenyi discloses a flat leaf spring having a rhombus shape. Such a leaf spring has a widened central zone which is received in a correspondingly shaped groove in a support member which is then secured to a framing member of the vehicle for fixedly entraining the spring against lateral deflection. However, the patent teaches that this suspension construction permits the frame to resist lateral deflection of the spring leaf, and the correspondingly grooved support member is an important feature of the invention of Barenyi. As a result, the patent does not teach or suggest the formation of a leaf spring whose shape inherently resists lateral deflection between the ends of the leaf.

SUMMARY OF THE INVENTION

The present invention overcomes the above-mentioned disadvantages by providing a vehicle spring having at least one leaf whose longitudinal edges taper outwardly from one end toward the other and thereby define a narrow end and a wide end of the elongated leaf. Preferably, the taper at each edge is the same and forms a spring having an elongated, trapezoidal shape. The wide and narrow longitudinal ends are secured by appropriate means to spaced apart positions on the vehicle frame, and the center of the spring leaf is mounted by appropriate means to an axle housing or the like. Thus, the angled edges resist lateral deflection along the entire length of the leaf. Moreover, the spring shape is well adapted for use in springs made of a material other than metal, such as a carbon-based synthetic material.

In the preferred embodiment, the vehicle spring comprises a single, substantially flat leaf having journal means for receiving a mounting pin in each longitudinal end of the leaf. For example, the ends of the leaf can be rolled or shaped to form an eye with a pin receiving bore at each end of the spring. In addition, the leaf is made of a resilient material whose spring constant urges the spring body toward an elliptical shape when the spring is not stressed but which orients the spring in a substantially linear alignment when the vehicle is supported on a ground surface by the suspended wheels. As a result, the resistance to lateral deflection is maximized by the linear alignment of the tapering longitudinal edges of the spring leaf. Of course, the means for mounting the spring in a vehicle suspension can be varied throughout a wide range without departing from the scope of the present invention as will be discussed in greater detail hereinafter.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which.

DETAILED DESCRIPTION OF A PREFERRED EMBODIMENT OF THE PRESENT INVENTION

Figure 1:
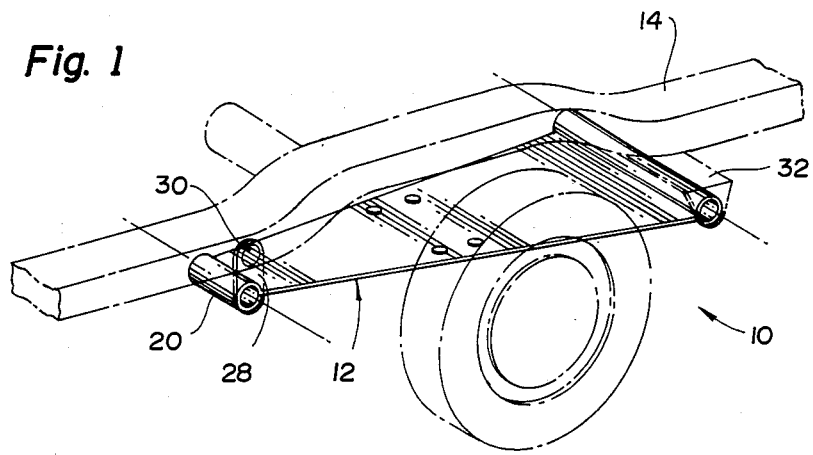
FIG. 1 is a perspective view of a portion of an automobile chassis employing a tapered leaf spring according to the present invention.

Referring first to FIG. 1, a motor vehicle suspension 10 comprises a spring 12 which is secured at its longitudinal ends to a vehicle framing member 14. The framing member 14 includes an arched portion 16 and spring attachment means at each end of the arched portion 16. In the preferred embodiment, the spring 12 comprises a single, substantially flat, i.e. having the same thickness and cross sectional shape throughout, spring leaf 18 adapted to be secured by the mounting means to the frame member 14.

Figure 2:
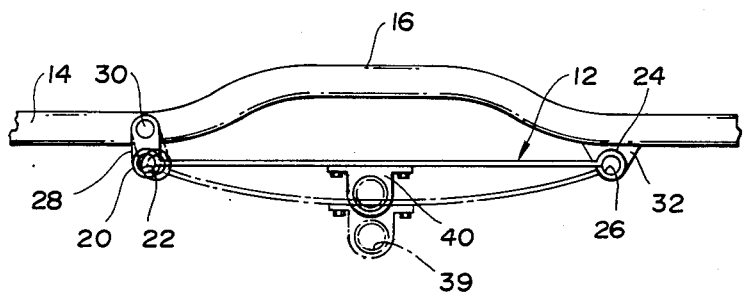
FIG. 2. is a side view of the suspension shown in FIG. 1.

As best shown in FIG. 2, each end of the spring leaf 18 includes a journal means for mounting the spring to the mounting means on the frame 14. The journal means in the preferred embodiment is in the form of an eye made from a rolled loop defining a pin receiving bore 22. Likewise, the other end of the spring leaf 18 includes a rolled loop 24 defining a pin receiving bore 26. The bore 22 registers with pin retaining bores in a spring shackle 28, while an end of the shackle 28 is pivotally mounted to the frame member 14 by a pin 30. The bore 26 registers with pin retaining bores in a spring mounting bracket 32 secured by welding or the like to the frame member 14.

Figure 3:
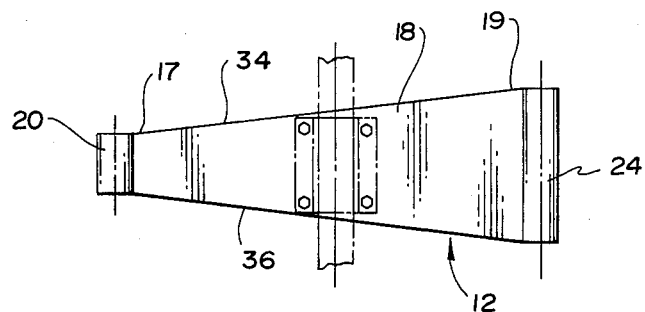
FIG. 3. is a top plan view of the tapered leaf spring shown in FIGS. 1 and 2.

As best shown in FIG. 3, the spring leaf 18 includes longitudinal edges 34 and 36 which taper outwardly as they extend from one end 17 to the other end 19 of the flat leaf 18. Preferably, the longitudinal edges are linear. As a result, the longitudinal edges 34 and 36 are inclined with respect to the longitudinal axis of the spring to resist lateral deflection of the spring 12 in the direction perpendicular to the longitudinal axis of the spring.

Referring to FIGS. 2 and 3, the intermediate portion of the spring can be provided with a mounting bracket for securing the wheel support means thereto. In the preferred embodiment, a bracket 40 is adapted to be bolted to the intermediate portion of the spring leaf 18 and is adapted to receive the axle housing 39 which rotatably supports an axle therein. The spring leaf 18 is normally resiliently biased to a semi-elliptical shape as shown in phantom line in FIG. 2. However, the spring constant of the leaf is selected by appropriate tempering or sizing of the leaf to permit the spring to orient itself in a substantially linear position, as shown in solid line in FIG. 2, when the vehicle is supported by its wheels on a ground surface. Of course, the spring constant can also be adjusted by adding additional leaves to the leaf spring 18 as desired or even varying the thickness of the spring along its length. In any event, it will be understood that the spring constant is dependent upon the weight of the vehicle to which the spring is applied.

In any event, it will be understood that the tapered leaf spring of present invention provides a leaf spring which resists lateral deflection of the spring between its ends by means wholly formed as a part of the spring body. Since the longitudinal edges of the spring body are formed by homogeneous portions of the spring body, the longitudinal edges and the adjacent widened portions of the spring body resists lateral deflection without substantially increasing the width of the spring at the point at which the wheel axle is secured to the spring. In addition, the resistance to lateral deflection is maximized when the spring is oriented in a linear, deflected position, and it does not require that the intermediate portion of the spring be fixedly secured to a rigid vehicle frame member to resist lateral deflection. Moreover, the widest portion of the leaf is rigidly supported by the frame and tends to resist torsional deflection of the leaf as well.

Having thus described the invention, many modifications thereto will become apparent to those skilled in the art to which it pertains without departing from the scope and spirit of the present invention as defined in the appended claims.

What is claimed is:

1. In combination with a vehicle supporting suspension having means for mounting to a vehicle frame the longitudinal ends of at least one elongated spring leaf so that the intermediate portion of said at least one leaf is resiliently suspended from said frame, the improvement comprising:
   means wholly formed with said at least one leaf for restricting lateral displacement of the intermediate portion of said at least one spring leaf,
   wherein said restricting means comprises said at least one leaf having longitudinal edges tapering outwardly from one longitudinal end toward the opposite longitudinal end, and thereby defining a first narrow end and a second wide end.

2. The invention as defined in claim 1 wherein said means further comprises said spring having resilient biasing means for maintaining said at least one leaf in a substantially linear orientation when the weight of said vehicle is supported by said suspension.

3. The invention as defined in claim 1 and further comprising means for pivotally securing said wide end of said at least one leaf to said frame and shackle means for securing said narrow end of said spring to said frame.

4. The invention as defined in claim 1 wherein said at least one leaf is shaped as an elongated trapezoid.

5. The invention as defined in claim 1 wherein said vehicle suspension includes an axle housing and further comprising means for securing said intermediate portion of said leaf spring to said axle housing.

6. The invention as defined in claim 1 wherein at least said second end includes journal means for defining a pin receiving bore.

7. The invention as defined in claim 1 wherein each longitudinal end of said spring includes journal means for defining a pin receiving bore.

8. The invention as defined claim 6 wherein each said journal means is integrally formed with said at least one leaf spring.

9. An elongated leaf spring comprising means wholly formed with said leaf spring for restricting lateral distortion of said spring intermediate its end,
   wherein said means comprises at least one elongated leaf having longitudinal edges tapering outwardly from one longitudinal end toward the opposite longitudinal end; and
   further comprising means at each longitudinal ends of said at least one leaf for mounting said at least one leaf to a support structure.

10. The invention as defined in claim 9 wherein said at least one leaf is shaped as an elongated trapezoid.

11. The invention as defined in claim 9 wherein each longitudinal edge is linear.

12. The invention as defined in claim 9 wherein said at least one leaf has a constant, cross sectional shape.

* * * * *